(12) United States Patent
French

(10) Patent No.: US 9,123,020 B2
(45) Date of Patent: Sep. 1, 2015

(54) MODELING, MONITORING, AND MANAGING SYSTEM DIMENSIONS FOR A SERVICE ASSURANCE SYSTEM

(75) Inventor: Paul B. French, Dublin Pike (IE)

(73) Assignee: International Business Machines Corporation, Armonk, NY (US)

( * ) Notice: Subject to any disclaimer, the term of this patent is extended or adjusted under 35 U.S.C. 154(b) by 1614 days.

(21) Appl. No.: 12/237,417

(22) Filed: Sep. 25, 2008

(65) Prior Publication Data

US 2010/0076798 A1   Mar. 25, 2010

(51) Int. Cl.
| | |
|---|---|
| G06F 17/50 | (2006.01) |
| G06F 9/44 | (2006.01) |
| G05B 19/418 | (2006.01) |
| G06F 9/46 | (2006.01) |
| G06Q 10/10 | (2012.01) |
| G06Q 10/06 | (2012.01) |
| G06Q 30/02 | (2012.01) |
| G06Q 40/08 | (2012.01) |

(52) U.S. Cl.
CPC .............. *G06Q 10/10* (2013.01); *G06Q 10/06* (2013.01); *G06Q 10/0635* (2013.01); *G06Q 10/06375* (2013.01); *G06Q 10/06395* (2013.01); *G06Q 30/02* (2013.01); *G06Q 40/08* (2013.01)

(58) Field of Classification Search
CPC ... G06Q 10/0635; G06Q 10/06; G06Q 40/08; G06Q 10/06375; G06Q 30/02
USPC ......................................................... 705/7, 8
See application file for complete search history.

(56) References Cited

U.S. PATENT DOCUMENTS

| | | | | |
|---|---|---|---|---|
| 5,691,925 | A | * | 11/1997 | Hardin et al. ...................... 703/2 |
| 5,749,334 | A | * | 5/1998 | Oda et al. ...................... 123/305 |
| 5,825,017 | A | * | 10/1998 | Pryor ......................... 250/208.1 |
| 6,029,195 | A | * | 2/2000 | Herz ............................. 725/116 |
| 6,427,132 | B1 | * | 7/2002 | Bowman-Amuah ............ 703/22 |
| 6,738,746 | B1 | * | 5/2004 | Barnard et al. ............... 705/7.17 |
| 6,784,973 | B1 | * | 8/2004 | Wozniak et al. ................ 355/40 |
| 6,859,781 | B1 | * | 2/2005 | Gloor et al. .................. 705/7.28 |
| 6,910,024 | B2 | * | 6/2005 | Krishnamurthy et al. .... 705/400 |

(Continued)

OTHER PUBLICATIONS

A voracious need for Vetronics by Howard, Courtney E, Military & Aerospace Electronics, vol. 19, Issue 9, pp. 18-10 and 22-23.*

(Continued)

*Primary Examiner* — Matthew Gart
*Assistant Examiner* — Harshad Parikh
(74) *Attorney, Agent, or Firm* — Cantor Colburn LLP; William Stock

(57) ABSTRACT

A user interface accepts a model of a proposed system solution for a service assurance system. A Dimensioning Engine receives the solution and determines dimensions for the solution. The dimensions specify any of: a quantity of CPUs, a rating for the quantity of CPUs, an amount of disk storage, a memory requirement, or a CPU processing parameter. A Dimensioning Model Manager stores data from equipment and product vendors to determine the solution by taking into account specific characteristics of an equipment or a product to be used in the service assurance system. A Dimensioning Monitor (DM) monitors the model of the solution against events occurring in the service assurance system. The DM transmits an alert if the service assurance system underperforms or overperforms with reference to the model. The DM determines changes to the model into line with a current set of operational conditions, or updates the dimensions.

20 Claims, 3 Drawing Sheets

(56) References Cited

U.S. PATENT DOCUMENTS

| | | | |
|---|---|---|---|
| 6,957,116 B2* | 10/2005 | Tsai et al. | 700/109 |
| 7,143,053 B2* | 11/2006 | Barnard et al. | 705/7.15 |
| 7,281,045 B2* | 10/2007 | Aggarwal et al. | 709/226 |
| 7,444,296 B1* | 10/2008 | Barber et al. | 705/17 |
| 7,464,041 B2* | 12/2008 | Merkin et al. | 705/2 |
| 2001/0027437 A1* | 10/2001 | Turbeville et al. | 705/38 |
| 2002/0035491 A1* | 3/2002 | Dombroski | 705/4 |
| 2002/0049625 A1* | 4/2002 | Kilambi et al. | 705/9 |
| 2002/0194025 A1* | 12/2002 | Notelovitz | 705/2 |
| 2004/0010429 A1* | 1/2004 | Vedula et al. | 705/7 |
| 2004/0167788 A1* | 8/2004 | Birimisa et al. | 705/1 |
| 2004/0201611 A1* | 10/2004 | Bagsby | 345/733 |
| 2005/0027656 A1* | 2/2005 | Tobler et al. | 705/53 |
| 2005/0028005 A1* | 2/2005 | Carson et al. | 713/200 |
| 2005/0075915 A1* | 4/2005 | Clarkson | 705/7 |
| 2005/0080721 A1* | 4/2005 | Kearney et al. | 705/38 |
| 2005/0091067 A1* | 4/2005 | Johnson | 705/1 |
| 2005/0108019 A1* | 5/2005 | Johnson | 705/1 |
| 2005/0128304 A1* | 6/2005 | Manasseh et al. | 348/207.99 |
| 2005/0261957 A1* | 11/2005 | Fisher et al. | 705/11 |
| 2006/0033625 A1* | 2/2006 | Johnson et al. | 340/573.1 |
| 2006/0089886 A1* | 4/2006 | Wong | 705/26 |
| 2006/0155582 A1* | 7/2006 | Brown | 705/3 |
| 2006/0161456 A1* | 7/2006 | Baker et al. | 705/2 |
| 2006/0173726 A1* | 8/2006 | Hall et al. | 705/8 |
| 2006/0190295 A1* | 8/2006 | Merkin | 705/2 |
| 2006/0224441 A1* | 10/2006 | Kerkar et al. | 705/11 |
| 2006/0235714 A1* | 10/2006 | Adinolfi et al. | 705/1 |
| 2006/0247944 A1* | 11/2006 | Calusinski et al. | 705/1 |
| 2006/0259309 A1* | 11/2006 | Pigott | 705/1 |
| 2006/0277085 A1* | 12/2006 | Neumann | 705/8 |
| 2006/0277299 A1* | 12/2006 | Baekelmans et al. | 709/224 |
| 2007/0081523 A1 | 4/2007 | Mishra | |
| 2007/0129961 A1* | 6/2007 | Skibinski et al. | 705/1 |
| 2007/0179805 A1* | 8/2007 | Gilbert et al. | 705/2 |
| 2007/0179811 A1* | 8/2007 | Reiner | 705/2 |
| 2007/0195694 A1* | 8/2007 | Schutz et al. | 370/230 |
| 2008/0086415 A1* | 4/2008 | Bubrig et al. | 705/40 |
| 2008/0140492 A1* | 6/2008 | Rousso et al. | 705/8 |
| 2008/0147516 A1* | 6/2008 | Rousso et al. | 705/27 |
| 2008/0208672 A1* | 8/2008 | Van Riel et al. | 705/9 |
| 2008/0270313 A1* | 10/2008 | Cullen et al. | 705/80 |
| 2008/0294507 A1* | 11/2008 | Reiner | 705/11 |
| 2008/0294584 A1* | 11/2008 | Herz | 706/46 |
| 2010/0076798 A1* | 3/2010 | French | 705/7 |
| 2014/0089887 A1* | 3/2014 | Bhattacharyya et al. | 717/102 |

OTHER PUBLICATIONS

Transactional events by Kevin Donnelly and Matthew Fluet, JFP 18 (5 And 6) pp. 649-706, 2008.*

* cited by examiner

MODELING, MONITORING, AND MANAGING SYSTEM DIMENSIONS FOR A SERVICE ASSURANCE SYSTEM

BACKGROUND

This invention relates to the field of computing and, in particular, to methods, computer program products, and apparatuses for modeling, monitoring, and managing system dimensions for a service assurance system in a telecommunications environment.

Changing one or more dimensions of a service assurance system can be an extremely costly and time-consuming exercise. Although the same software may be included in a plurality of service assurance systems, each time a service assurance system is sold, problems arise in terms of determining one or more dimensions of a system solution. Illustratively, these dimensions may specify one or more of a number or quantity of CPUs, a type of CPU, a database size, or a memory size. There is an even more difficult problem of continually monitoring the dimensions of a running system so as to ensure that the assumptions and rules of the original model for the system solution are correct. Changes to the model and dimensions may be required if some of the original assumptions are invalid, or if the model changes. The model may change if, for example, new data sources are added or additional customers use a communications network. It may also change as new services are supported or if the size of the actual network itself increases, e.g., an increased number of network elements.

The dimensions of the solution depend on a number of variables which are particular to a telecommunications service assurance system. These variables include, but are not limited, to: (i) number and complexity of data sources, (ii) number and complexity of Key Performance Indicators (KPIs), Key Quality Indicators (KQIs) and Combined KQIs, (iii) data summarization policies, (iv) length of time to be stored, (v) number and complexity of reports to be generated from the data, (vi) number and complexity of Service Level Agreements (SLAs) to be supported, and so on.

At present, there are a handful of in-house, deployment-specific tools for managing system dimensions, but no techniques currently exist that are generic and applicable to a variety of different settings. More specifically, these existing tools are not applicable to a variety of different settings because they do not model variables in a solution-neutral manner that is independent of actual data sources. Moreover, these existing tools do not function by monitoring or comparing a model against an equivalent running system to update the system solution where necessary to reflect a changing reality.

SUMMARY

A computer-executable method for modeling, monitoring, and managing system dimensions for a service assurance system, the method comprising accepting a model of a proposed system solution for the service assurance system; determining one or more dimensions for the system solution from the accepted model; monitoring the model of the proposed system solution against one or more events occurring in the service assurance system; transmitting an alert when the service assurance system underperforms with reference to the model; transmitting the alert when the service assurance system overperforms with reference to the model; and, in response to an occurrence of one or more events in the service assurance system, performing at least one of: (a) determining one or more changes to the model to bring the model into line with a currently existing set of operational conditions; or (b) updating the one or more dimensions.

Computer program products and apparatuses corresponding to the above-summarized methods are also described and claimed herein. Other methods, apparatuses, and/or computer program products according to embodiments will be or become apparent to one with skill in the art upon review of the following drawings and detailed description. It is intended that all such additional methods, apparatuses, and/or computer program products be included within this description, be within the scope of the present invention, and be protected by the accompanying claims.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

As a preliminary matter, it should be noted that the term "service assurance system" as used herein encompasses any of several different functionalities. These functionalities include any of Performance Management (PM), Service Quality Management (SQM), and Service Level Management (SLM).

Figure 1:
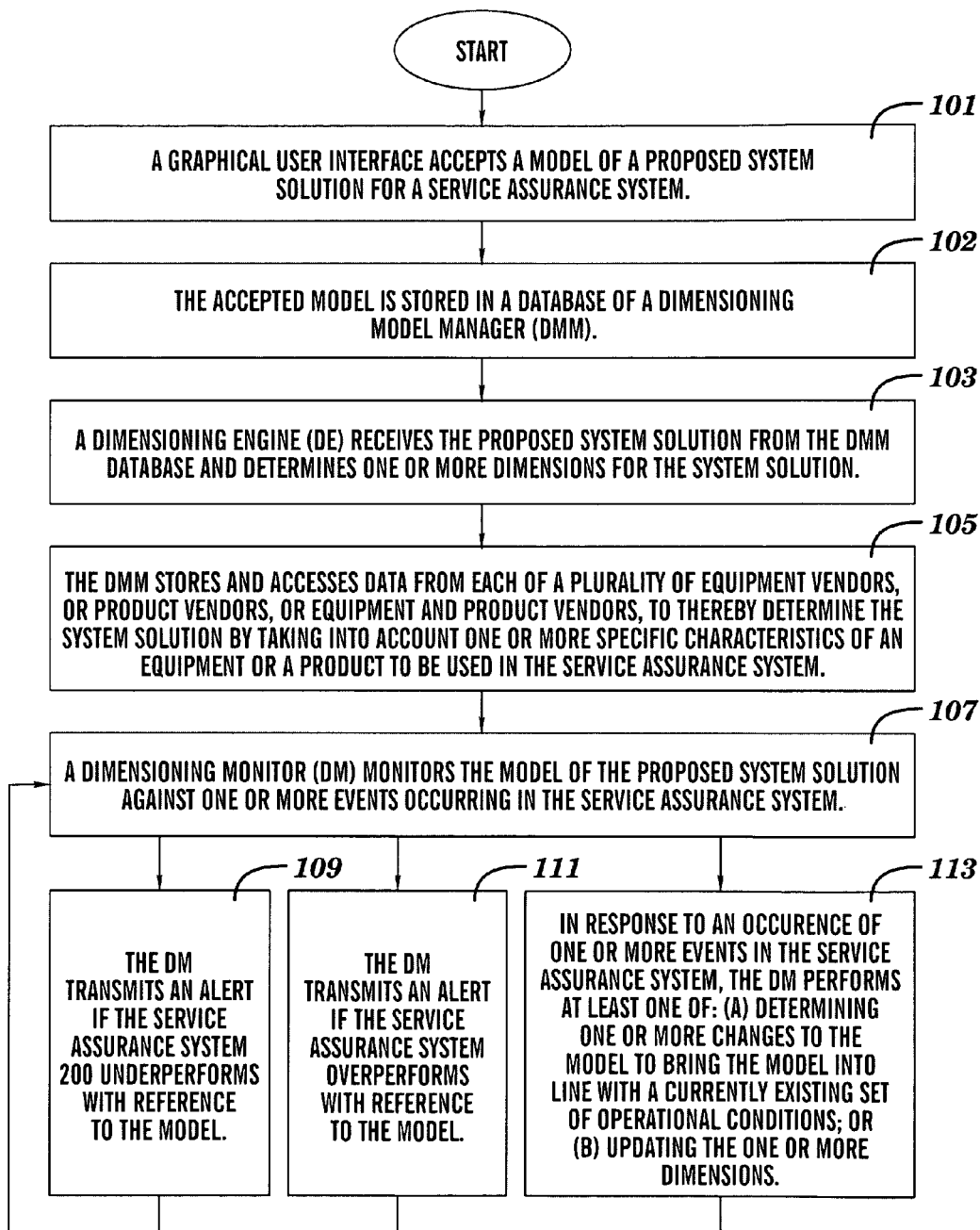
FIG. 1 is s a flowchart setting forth an illustrative computer-executable operational sequence for modeling, monitoring, and managing system dimensions for a service assurance system.
Figure 2:
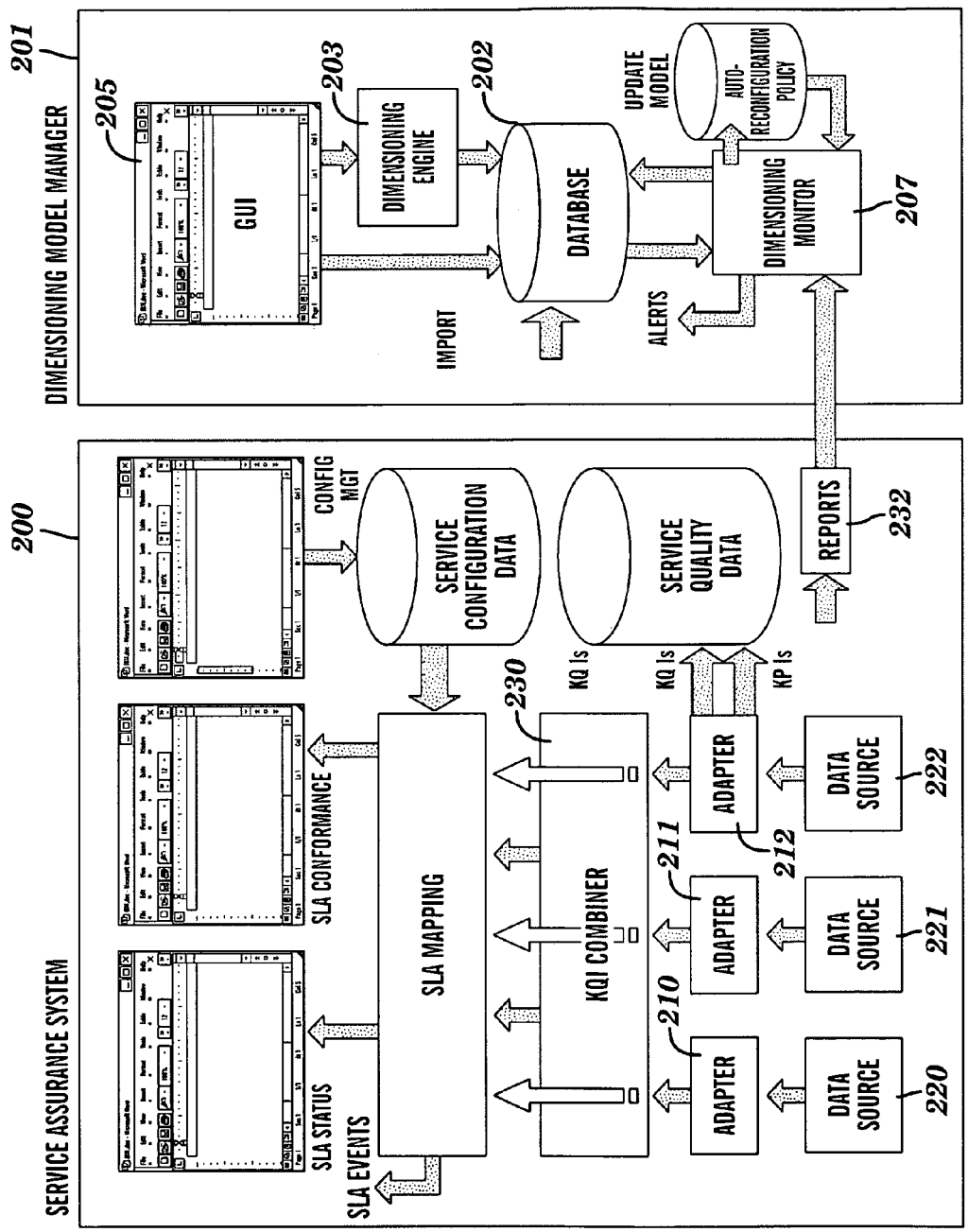
FIG. 2 is s a block diagram of an illustrative apparatus for modeling, monitoring, and managing system dimensions for a service assurance system.

FIG. 1 is a flowchart setting forth an illustrative computer-executable operational sequence for modeling, monitoring, and managing system dimensions for a service assurance system 200 (FIG. 2). The procedure of FIG. 1 commences at block 101 where a graphical user interface 205 (FIG. 2) accepts a model of a proposed system solution for the service assurance system 200. Alternatively or additionally, the model may be imported via an interface such as a standard XML file, or via another type of standard interface, or via a non-standard interface. Alternatively or additionally, the graphical user interface 205 (FIG. 2) may provide a user option for inputting the model by importing the model via an XML file.

Next, at block 102 (FIG. 1), the accepted model is stored in a database 202 (FIG. 2) of a Dimensioning Model Manager (DMM) 201. The operational sequence of FIG. 1 progresses to block 103 where a Dimensioning Engine (DE) 203 (FIG. 2)

receives the proposed system solution from the DMM database 202 and determines one or more dimensions for the system solution. With respect to the service assurance system 200, the one or more dimensions specify one or more of a number or quantity of Central Processing Units (CPUs), a rating for the number or quantity of CPUs, an available amount of disk storage, a memory requirement, and a CPU processing parameter.

The procedure of FIG. 1 advances to block 105 where the DMM 201 (FIG. 2) stores and accesses relevant data from each of a plurality of supported equipment vendors and supported product vendors to thereby determine the system solution by taking into account one or more specific characteristics of an equipment or a product to be used in the service assurance system. For example, this data may characterize the differing abilities of equipment and products, such as Sun Microsystems™, Oracle™, or DB2™, offered by different vendors. Optionally, the DMM 201 (FIG. 2) may store and access the relevant data referred to above in order support 'what if' functionality in conjunction with the DE 203, such that the DE will determine one or more hypothetical dimensions for the system solution in response to the graphical user interface 205 accepting one or more proposed hypothetical changes to the model. These hypothetical changes may be accepted or proposed, or both, at block 101 (FIG. 1). These changes may encompass, for example, a network expansion or an increased customer base.

Next, at block 107, a Dimensioning Monitor (DM) 207 (FIG. 2) monitors the model of the proposed system solution against one or more events occurring in the service assurance system 200 (FIG. 2). Blocks 109, 111, and 113 (FIG. 1) may be performed concurrently or in any order. At block 109, the DM 207 (FIG. 2) transmits an alert if the service assurance system 200 underperforms with reference to the model. An example of this could be if the model proposed a daily storage requirement of, say, 1 Gb for a particular adapter 210 whereas, in reality, the adapter 210 produces 1.5 Gb of data daily on a regular basis. Under these circumstances, the DM 207 will flag this situation and automatically update the model as described hereinafter in connection with block 113 (FIG. 1).

At block 111, the DM 207 (FIG. 2) transmits the alert if the service assurance system overperforms with reference to the model. An example of this could be if the model proposed a daily storage requirement of, say, 2 Gb for a particular adapter 210 whereas, in reality, the adapter 210 produces no more than 1 Gb of data daily on a regular basis. At block 113 (FIG. 1), in response to an occurrence of one or more events in the service assurance system 200 (FIG. 2), the DM 207 performs at least one of: (a) determining one or more changes to the model to bring the model into line with a currently existing set of operational conditions; or (b) updating the one or more dimensions. Illustratively, the updating of the one or more dimensions is performed by specifying at least one of: an increase in memory, a decrease in memory, a change in network bandwidth, an increase in CPU processing power, or a decrease in CPU processing power; or configuration of additional database storage facilities; for the service assurance system 200.

FIG. 2 is s a block diagram of an illustrative apparatus for modeling, monitoring, and managing system dimensions for an existing service assurance system 200. In the example of FIG. 2, this illustrative apparatus is provided in the form of the DMM 201 discussed previously. The DMM 201 includes the GUI 205, the DE 203, the database 202, and the DM 207. The GUI 205 is operatively coupled to the DE 203 and the database 202. The DE 203 is in communication with the database 202. The database 202 is operatively coupled to the DM 207.

In practice, the service assurance system 200 may be implemented as part of a telecommunications network. The service assurance system 200, in communication with the DM 207 of the DMM 201, includes a respective plurality of adapters 210, 211, 212, each of which is operatively coupled to a corresponding data source 220, 221, 222, Each adapter 210, 211, 212 collects data from a corresponding data source 220, 221, 222 on a periodic or repeated basis. Typically, the data is collected periodically wherein the time duration of the period is specific to a given adapter 210, 211, 212. Examples of periods vary from 5 minutes to hourly or daily.

The adapters 210, 211, 212 each process data received from a corresponding data source 220, 221, 222. In processing this data, the adapters 210, 211, 212 each produce one or more Key Performance Indicators (KPIs) which are stored in a service assurance system database. A KPI is a measure of a metric on a specific resource. An example of a KPI in a wireless telecommunications system would be number of Attach Attempts per Subscriber. The adapters 210, 211, 212 also each produce one or more Key Quality Indicators (KQIs) which are aggregations of KPIs. These KQIs are also stored in the service assurance system database. A specific definition of what outputs an adapter produces is stored in a service model in the service assurance system 200.

Depending on the size of the network and the number of customers, multiple adapters 210, 211, 212 of the same type may be required in any particular deployment. Therefore, data storage requirements for the same adapter type may differ per deployment. The processing required to process and produce KPIs may be different for each type of adapter of adapters 210, 211, 212. This affects the amount of memory and CPU cycles that are required by the adapters 210, 211, 212 to produce KPIs. In a dimensioning solution, this factor needs to be taken into account. The mediation (i.e. function to collect the data from the data source) may vary in complexity, e.g. decoding (Abstract Syntax Notation) ASN.1 files requires more processing power and (possibly) memory than ASCII (Comma Separated Files) CSV files, for example. This also affects the dimensioning of a system.

One or more of the following dimensioning attributes are required for each adapter of adapters 210, 211, and 212. These attributes are fed into the DE 203 as described below. The items which affect the dimensions of a solution from the point of view of adapters 210, 211, 212 include, but are not limited, to any of: (a) number of sample periods per day, (b) number of metrics per batch, (c) number of Resource dimensions that KPIs and KQI are produced, (d) number of KPIs produced per batch, (e) number of KPIs stored per batch, (f) number of KQIs produced per batch, (g) number of KQIs stored per batch, (h) Memory_Complexity indicator of each KQI and KPI, (A Memory_Complexity Indicator is a DMM concept which defines the computer memory resources required to produce a particular KPI or KQI) (i) CPU_Complexity indicator of each KQI and KPI, (A CPU_Complexity Indicator is a DMM concept which defines the computer CPU resources required to produce a particular KPI or KQI) (j) number of resources per period, which can be quite complex and prone to error, wherein an example may be predicting what percentage of a subscriber base would perform an "Attach" procedure per period; or (k) aggregation policy (hourly, daily, weekly, monthly).

The adapters 210, 211, 212 are operatively coupled to a KQI Combiner 230. In this manner, KQIs can be used in a combined manner with other KQIs to produce Combined KQIs. Combined KQIs can themselves consist of other Combined KQIs in a hierarchical fashion. Hierarchical computation of KQIs requires more memory and CPU than simpler KQI models. One or more of the following dimensioning attributes are required for each Combined KQI model. These are the items which affect the dimensions of a solution from the point of view of Combined KQIs, wherein these items include, but are not limited, to any of: (a) number of sample periods per day, (b) hierarchical complexity of the CKQI, (c) window size of computation, or (d) number and complexity of KQIs involved in CKQI.

The service assurance system 200 contains a number of reports 232. The results of these reports 232 are stored and maintained for a period of time. The reports 232 themselves can be categorized in terms of their complexity which, among other things, requires indexes to be created on a plurality of tables on which the reports 232 are run. These indexes themselves require storage and also use up system memory and CPU processing. One or more of the following dimensioning attributes are required for report definition. These items, which affect the dimensions of a solution from the point of view of report definitions, include but are not limited to any of: (a) number and complexity of indexes required to support; (b) Memory_Complexity indicator report definition; (c) CPU_Complexity indicator report definition; (d) storage period of report result; or (e) aggregation policy (hourly, daily, weekly, monthly).

The DMM 201 stores a dimensioning model and produces a dimensioning output. The algorithms used to produce the output are part of the DE 203. The DE 203 contains the algorithms used to produce the storage, memory and CPU dimensions for the model. The DE 203 produces the following as output: (a) disk storage requirements; (b) memory requirements; and (c) CPU requirements. As well as the dimensioning attributes described above, the DE 203 also uses one or more of the internal attributes shown below in Table 1:

TABLE 1

Memory/heap used per Agent process (Mb)
Memory/heap used per Simple KQI (bytes)
Memory/heap used per Complex KQI (bytes)
Memory/heap used per Combined KQI (bytes)
CPU % used per Simple KQI
CPU % used per Complex KQI
CPU % used per Combined KQI The purpose of the DM 207 is to monitor the running service assurance system and compare the actual operational system with the model of the system. If there is a discrepancy (either over of under) between any of the dimensioning attributes, then the DM 207 will generate an alert. Auto-reconfiguration of the model is also implemented by the DM 207 according to a defined re-configuration policy. The DM 207 may also update system dimensions also, e.g. increase memory, update network bandwidth, 'add' CPU processing power, etc.

Figure 3:
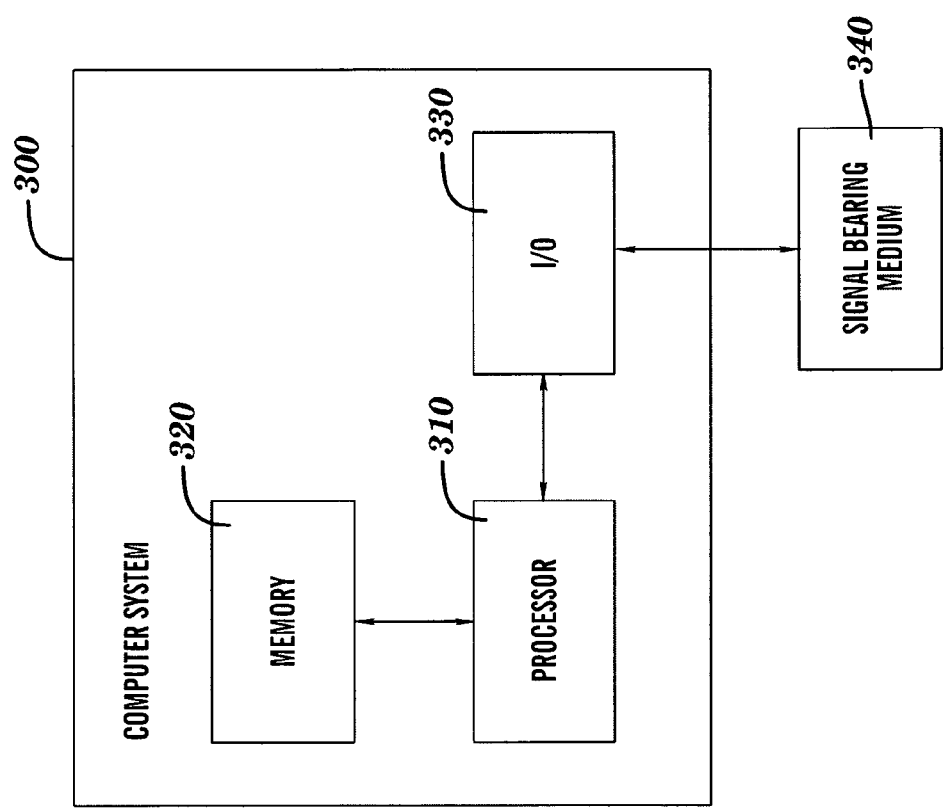
FIG. 3 is a block diagram setting forth an illustrative computer program product for modeling, monitoring, and managing system dimensions for a service assurance system.

FIG. 3 is a block diagram setting forth an illustrative computer program product for modeling, monitoring, and managing system dimensions for a service assurance system. The system includes a computer 300 operatively coupled to a signal bearing medium 340 via an input/output interface (I/O) 330. The signal bearing medium 340 may include a representation of instructions for modeling, monitoring, and managing system dimensions for a service assurance system, and may be implemented as, e.g., information permanently stored on non-writeable storage media (e.g., read-only memory devices within a computer, such as CD-ROM disks readable by a CD-ROM drive), alterable information stored on a writeable storage media (e.g., floppy disks within a diskette drive or hard disk drive), information conveyed to a computer by a communications medium, such as through a computer or telephone network, including wireless or broadband communications networks, such as the Internet, etc.

The computer 300 includes a processor 310 that processes information for modeling, monitoring, and managing system dimensions for a service assurance system, wherein the information is represented, e.g., on the signal bearing medium 340 and communicated to the computer 300 via the I/O 330, wherein the processor 310 saves information as appropriate into a memory 320. This information may also be saved into the memory 320, e.g., via communication with the I/O 330 and the signal bearing medium 340.

The processor 310 executes a first program comprising instructions for modeling, monitoring, and managing system dimensions for a service assurance system. A graphical user interface accepts a model of a proposed system solution for the service assurance system. The accepted model is stored in a database of a Dimensioning Model Manager (DMM). A Dimensioning Engine (DE) receives the proposed system solution from the DMM database and determines one or more dimensions for the system solution. The one or more dimensions specify one or more of a number or quantity of Central Processing Units (CPUs), a rating for the number or quantity of CPUs, an available amount of disk storage, a memory requirement, and a CPU processing parameter. The DMM stores and accesses relevant data from each of a plurality of supported equipment vendors and supported product vendors to thereby determine the system solution by taking into account one or more specific characteristics of an equipment or a product to be used in the service assurance system. A Dimensioning Monitor (DM) monitors the model of the proposed system solution against one or more events occurring in the service assurance system. The DM transmits an alert if the service assurance system underperforms with reference to the model. The DM transmits the alert if the service assurance system overperforms with reference to the model. In response to an occurrence of one or more events in the service assurance system, the DM performs at least one of: (a) determining one or more changes to the model to bring the model into line with a currently existing set of operational conditions; or (b) updating the one or more dimensions. The foregoing steps may be implemented as a program or sequence of instructions within the memory 320, or on a signal bearing medium, such as the medium 340, and executed by the processor 310.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention The foregoing exemplary embodiments may be provided in the form of computer-implemented processes and apparatuses for practicing those processes. The exemplary embodiments can also be provided in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be provided in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments execute specific microprocessor machine instructions. The computer program code could be implemented using electronic logic circuits or a microchip.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer-executable method for monitoring and managing system dimensions by a service assurance system implemented over a computer architecture to monitor a performance of the computer architecture, the method comprising:

accepting, by a computer processor of the service assurance system communicatively coupled with a memory, a proposed system solution for the service assurance system;

determining, by the computer processor of the service assurance system, one or more dimensions of the system dimensions from the proposed system solution;

monitoring, by the computer processor of the service assurance system, the computer architecture in accordance with a determination of one or more events occurring in the computer architecture across the one or more dimensions;

generating and transmitting a first alert when the service assurance system determines an underperformance with respect to the monitoring of the computer architecture;

generating and transmitting a second alert when the service assurance system determines an overperformance with respect to the monitoring of the computer architecture; and based on the transmitting of one or more of the first and second alerts, performing at least one of:

determining one or more changes to the proposed system solution to bring the proposed system solution into line with a currently existing set of operational conditions in accordance with the one or more events, and updating the one or more dimensions to correct a cause of the one or more of the first and second alerts.

2. The method of claim 1 further comprising using a graphical user interface to accept the proposed system solution for the service assurance system.

3. The method of claim 1 further comprising accepting the proposed system solution by importing an XML file.

4. The method of claim 1 further comprising storing and accessing data from each of a plurality of equipment and product vendors to thereby determine the proposed system solution by taking into account one or more specific characteristics of an equipment or a product to be used in the computer architecture.

5. The method of claim 1 wherein the one or more dimensions specify one or more of a number or quantity of Central Processing Units (CPUs), a rating for the number or quantity of CPUs, an available amount of disk storage, a memory requirement, and a CPU processing parameter.

6. The method of claim 4 further comprising storing and accessing the data from each of the plurality of equipment and product vendors to provide a 'what if' functionality comprising determining one or more hypothetical dimensions for the system solution in response to accepting one or more proposed hypothetical changes to the proposed system solution.

7. The method of claim 6 wherein the one or more hypothetical changes encompass at least one of a network expansion and an increased customer base.

8. A computer program product comprising a storage medium readable by a computer processor and storing instructions for execution by the computer processor for monitoring and managing system dimensions for a service assurance system implemented over a computer architecture to monitor a performance of the computer architecture, the method comprising:

accepting, by a computer processor of the service assurance system communicatively coupled with a memory, a proposed system solution for the service assurance system;

determining, by the computer processor of the service assurance system, one or more dimensions of the system dimensions from the proposed system solution;

monitoring, by the computer processor of the service assurance system, the computer architecture in accordance with a determination of one or more events occurring in the computer architecture across the one or more dimensions;

generating and transmitting a first alert when the service assurance system determines an underperformance with respect to the monitoring of the computer architecture;

generating and transmitting a second alert when the service assurance system determines an overperformance with respect to the monitoring of the computer architecture; and based on the transmitting of one or more of the first and second alerts, performing at least one of:

determining one or more changes to the proposed system solution to bring the proposed system solution into line with a currently existing set of operational conditions in accordance with the one or more events, and updating the one or more dimensions to correct a cause of the one or more of the first and second alerts.

9. The computer program product of claim 8 further comprising using a graphical user interface to accept the proposed system solution for the service assurance system.

10. The computer program product of claim 8 further comprising accepting the proposed system solution by importing an XML file.

11. The computer program product of claim 8 further comprising storing and accessing data from each of a plurality of equipment and product vendors to thereby determine the proposed system solution by taking into account one or more specific characteristics of an equipment or a product to be used in the computer architecture.

12. The computer program product of claim 8 wherein the one or more dimensions specify one or more of a number or quantity of Central Processing Units (CPUs), a rating for the number or quantity of CPUs, an available amount of disk storage, a memory requirement, and a CPU processing parameter.

13. The computer program product of claim 11 further comprising storing and accessing the data from each of a plurality of equipment and product vendors to provide a 'what if' functionality comprising determining one or more hypothetical dimensions for the system solution in response to accepting one or more proposed hypothetical changes to the proposed system solution.

14. The computer program product of claim 13 wherein the one or more hypothetical changes encompass at least one of a network expansion and an increased customer base.

15. An apparatus for monitoring and managing system dimensions for a service assurance system implemented over a computer architecture to monitor a performance of the computer architecture, the apparatus comprising:
　a graphical user interface for accepting a system solution for the service assurance system;
　a Dimensioning Model Manager (DMM) operatively coupled to the graphical user interface, the DMM including a database for storing the proposed system solution;
　a Dimensioning Engine (DE), operatively coupled to the DMM, for receiving the proposed system solution from the database and determining one or more dimensions of the system dimensions from the proposed system solution;
　a Dimensioning Monitor (DM), operatively couple to the database, for monitoring the computer architecture in accordance with a determination of one or more events occurring in the computer architecture across the one or more dimensions, generating and transmitting a first alert when the service assurance system determines an underperformance with respect to the monitoring of the computer architecture, generating and transmitting a second alert when the service assurance system determines an overperformance with respect to the monitoring of the computer architecture, and based on the transmitting of one or more of the first and second alerts, performing at least one of:
　　determining one or more changes to the proposed system solution to bring the proposed system solution into line with a currently existing set of operational conditions in accordance with the one or more events, and
　　updating the one or more dimensions to correct a cause of the one or more of the first and second alerts.

16. The apparatus of claim 15 wherein the one or more dimensions specify one or more of a number or quantity of Central Processing Units (CPUs), a rating for the number or quantity of CPUs, an available amount of disk storage, a memory requirement, and a CPU processing parameter.

17. The apparatus of claim 16 wherein the DMM stores and accesses data from each of a plurality of equipment and product vendors to thereby determine the proposed system solution by taking into account one or more specific characteristics of an equipment or a product to be used in the computer architecture.

18. The apparatus of claim 15 wherein the DMM stores and accesses the data from each of a plurality of equipment and product vendors in order support 'what if' functionality in conjunction with the DE, such that the DE determines one or more hypothetical dimensions for the system solution in response to the graphical user interface accepting one or more proposed hypothetical changes to the proposed system solution.

19. The apparatus of claim 18 wherein the one or more hypothetical changes encompass one or more of a network expansion and an increased customer base.

20. The apparatus of claim 15 wherein the graphical user interface provides a user option for inputting the proposed system solution by importing an XML file.

* * * * *